Jan. 19, 1932.  E. B. CARNS  1,842,068
AIRCRAFT WING
Filed May 5, 1927  2 Sheets-Sheet 1
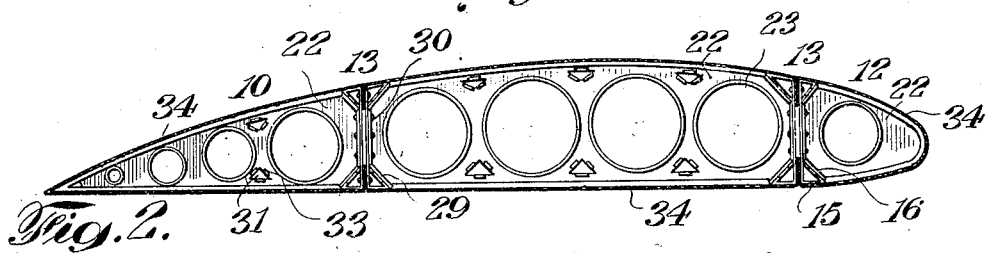
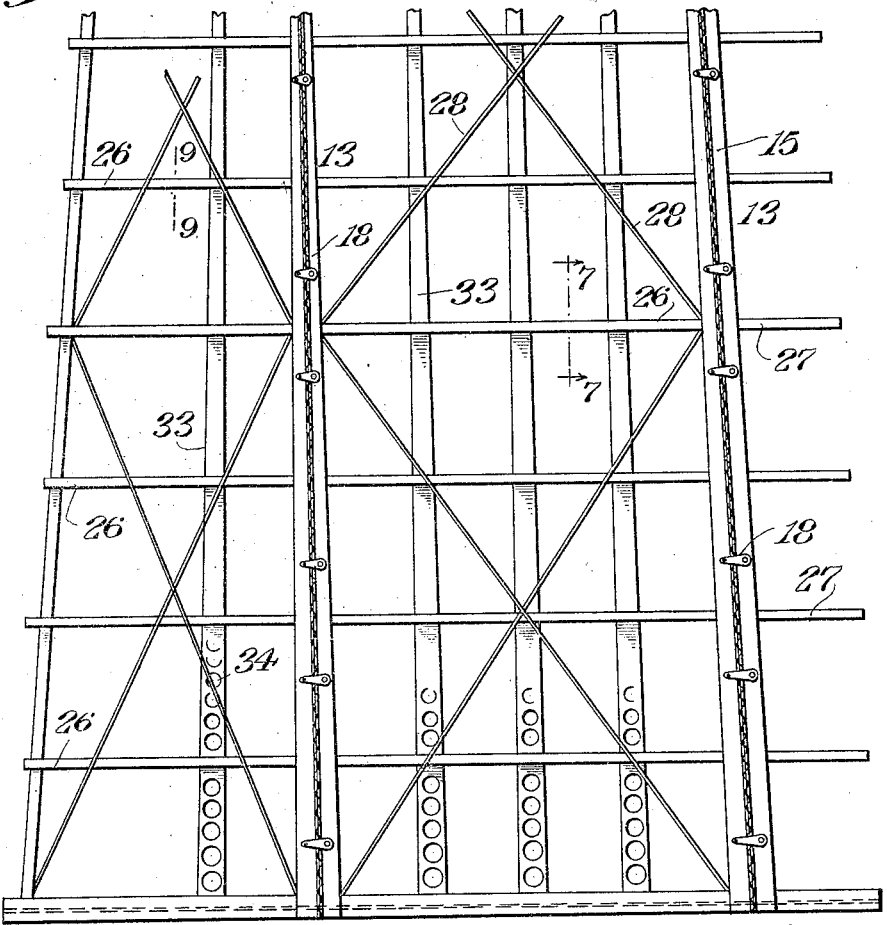

Jan. 19, 1932. E. B. CARNS 1,842,068
AIRCRAFT WING
Filed May 5, 1927 2 Sheets-Sheet 2
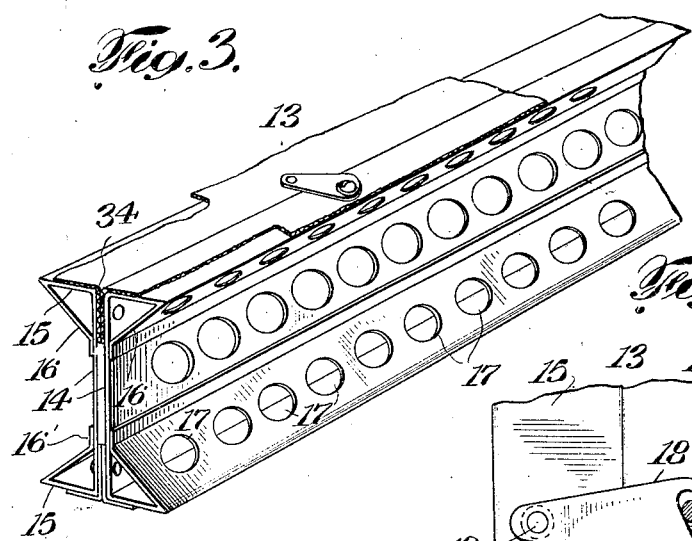
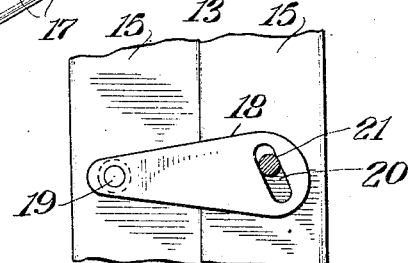
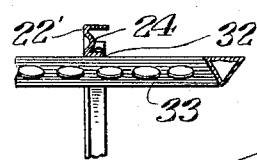
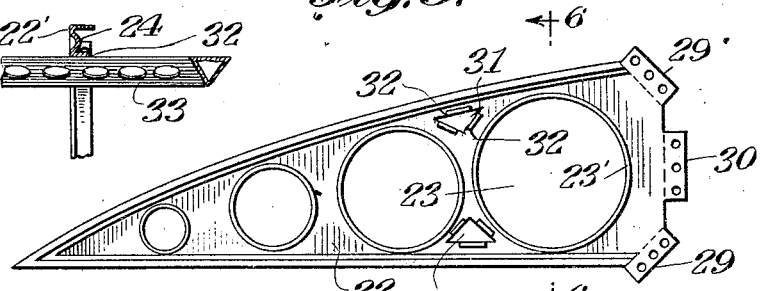
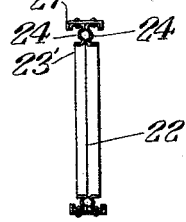
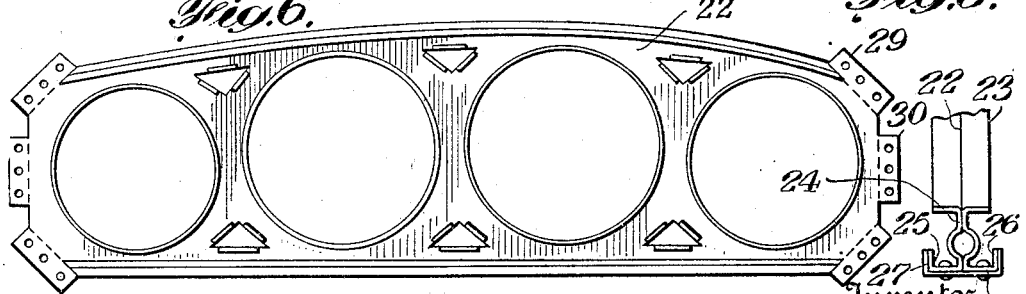
Inventor
Edmund B. Carns
By his Attorneys,
Hoguet & Neary.

Patented Jan. 19, 1932

1,842,068

UNITED STATES PATENT OFFICE

EDMUND B. CARNS, OF NEW YORK, N. Y., ASSIGNOR TO CAIRNS DEVELOPMENT COMPANY, OF WILMINGTON, DELAWARE, A CORPORATION OF DELAWARE

AIRCRAFT WING

Application filed May 5, 1927. Serial No. 188,986.

My invention relates to improvements in air craft wings, and the object of my invention is to produce a strong, simple, light wing which can be economically produced in quantities, and, preferably, can be made of sheet metal parts shaped to give the necessary rigidity and lightness.

My invention is, also, intended to produce a wing composed of a plurality of longitudinally separable sections, that is, sections that are separable in the direction from front to rear of the wing, and construct these sections so that they may be quickly and strongly assembled to make the complete wing.

My invention is further intended to produce a sectional wing of this character which has strong, light spars, preferably of sheet metal which are separable along their length, and arranged so that half of a spar will be in one wing section, and the other half of the spar will be in the adjacent wing section, so that when the sections are united, the spars will be completed, and can be fastened together.

In this way, each spar serves as a connecting element between adjoining or abutting sections.

My invention, also, contemplates the use of spars which can be shaped of sheet metal so as to assume the general shape of an I-beam, which form of spar lends itself to the construction of the separable wing and the easy union of the parts.

In my wing construction, I, also, preferably employ transverse ribs which are in the form of sheet metal plates something like bulk heads, and which conform to the transverse contour of the wing, and are shaped to very effectively brace the wing, and to facilitate the connection of other parts.

My invention is further intended to provide means for fastening the cover which is preferably of metallic fabric, drum tight over the several sections, and with parts of the fabric bound in between the spar members. These, and other advantages, will appear from the following description.

Reference is to be had to the accompanying drawings forming a part of this specification, in which similar reference characters represent the corresponding parts in all views.

Figure 1 is a cross section of a wing showing my invention.

Figure 2 is a broken plan view on an enlarged scale of a part of the wing frame.

Figure 3 is a broken perspective view of one of the spars.

Figure 4 is a broken detail plan showing a means of fastening the spar members together.

Figure 5 is an enlarged sectional elevation of the after part of a wing rib.

Figure 6 is a view similar to Figure 5 but showing a rib for the mid-section of the wing.

Figure 7 is a cross section on the line 6—6 of Figure 5.

Figure 8 is a broken enlarged detail of a part of the structure shown in Figure 7, and Figure 9 is a broken detail section showing the connection between one of the longitudinal braces and a cross rib.

The wing is made up of sections 10, 11 and 12, separable in the direction, along the wing length, and the wing is preferably made up of three of these sections, as illustrated, but, obviously, there may be a greater or less number of them.

The wing is provided with longitudinal spars 13, there being a spar between each section, and the spars are separable along their length, and arranged so that half of a spar will be held in one section, and the other half in the next adjacent section, so that when the two sections are brought together, the two spar halves will meet and be complementary one to the other, so as to complete a whole spar.

These spars can be conveniently, cheaply, and economically made from sheet metal plates 14 which are spaced slightly apart, as shown in Figure 3, and each plate is, at its upper and lower edge, bent outwardly, as at 15, then inwardly, as at 16, and finally merges in a flange 16' which lies against the body of the plate 14, and can be riveted or otherwise fastened thereto.

Thus, each half spar will comprise a plate 14, having tubular triangular flanges at the upper and lower part, thus giving to each spar half a light, strong shape, and when the two halves are fastened together, as at Figure 3, a complete spar, having the general shape of an I-beam, is produced.

The surfaces 16 are lightened by perforations 17, and the plate or web 14 can be similarly lightened, as shown.

These spars taper in both directions from the center toward the end, so as to lighten them and distribute the weight according to the strain, and the two halves of the spar can be fastened together in any convenient way.

There are many ways of quickly and securely attaching them and, as an example of a suitable way, I have shown, at the top and bottom surfaces of each spar, a series of cam levers 18, each lever being pivoted to one spar member as at 19 in Figure 4, and the wider end which overlaps the second spar member, has in it, a cam slot 20, which receives a stud 21 on the second spar member; thus, when the lever 18 is moved in one direction, the spar members are loosened with reference to each other, and when the lever is moved in the other direction, the spar members are clamped firmly together. When they have been fastened together in their ultimate shape, a drop of solder or equivalent means can be dropped in the slot 20, to prevent any possible loosening of the lever 18.

The wing is provided with the necessary number of transverse ribs 22 or, comprising plates 22 and 22′ which are given the shape to impart the proper contour to the wing and which extend from top to bottom of the wing sections. Some of these ribs are double and some single. The double ribs comprise each two plates 22 which abut one against the other and can be fastened together if desired, and which are lightened by perforations 23, each perforation having a reinforcing flange 23′ around it.

Near their edges, the plates are, also, provided with complementary corrugations 24 which greatly stiffen them, and the extreme edges of the plates merge into flanges 25 extending at right angles to the planes of the plates, and stiffened by return bends 26, as shown in Figure 8. The flanges 25 are covered by a cap 27 which fits snugly over them, which is riveted or otherwise fastened to them.

Thus, the double ribs like the spars are of a generally I-beam section, and it will be understood that they will be shaped to conform to the part of the wing in which they occur. Thus, the ribs in the section 10 will give shape to the trailing edge of the wing, ribs in section 12 will give the front contour of the wing, and the ribs in the section 11 will, of course, correspond to the mid-section contour of the wing.

The ribs, where they are of double formation, that is, two plates, occur only at the points where the drift rods 28 are attached, as at such places, increased strength is necessary, but at intervening points of the wing, single ribs 22′ can be used which are like half of one of the ribs already described.

To provide for rigidly and easily connecting the ribs to the adjacent spar member, each rib 22 or 22′, as the case may be, has, at its ends or at the end next a spar member, gussets 29 and 30, which can be turned up from the metal of the rib, and which are adapted to fit snugly against the faces 16 of the spar member and, also, against the web or plate 14. They can be clinched firmly in place and fastened by riveting or otherwise, thus making a strong and easily applied fastening. While the spar of this invention has been shown as substantially like an I-beam in construction, it should be understood that the invention is not to be limited to an I-beam construction. The invention, in its broader aspect, covers a spar built up of members carried by respective wing sections; each spar section carries a stiffening member having a flat face; the completed spar is built up by bringing these flat faces into flatwise contacting abutment with each other, the plane of such contact extending longitudinally of the wing.

The wing is provided with longitudinal braces 33 extending through the wing and tapering toward the tips and to facilitate the attachment and connection of the braces, the several ribs 22 and 22′ are provided with aligning holes 31 disposed near the upper and lower parts of the ribs, and the contour of which corresponds to the cross section of the braces 33.

As the braces 33 which are tubular and preferably triangular in cross section taper from the middle of the wing toward the ends, the holes 31 will, obviously, be of varying sizes so as to fit the braces all along the wing, and, as a convenient means of fastening the braces and the ribs together, the ribs can have flanges or gussets 32 turned up around the edges of the hole 31, and adapted to be riveted or otherwise fastened to the braces 33.

The braces can be lightened by holes 34, as in Figure 2, and it will be seen that when the wing sections are made as described, they can be readily and firmly assembled, as each section forms an element complete in itself, and, where the spars occur, half will be in one element and the complementary part in the adjacent section.

Thus, it will be seen that these sections may be made in duplicate if desired, and then assembled easily and accurately.

For a cover, I prefer to use a metallic fabric consisting of a wire mesh body and a sheet of deposited metal thereon. Such a cover, while my invention, is not here claimed. Any suitable cover can be used, but such a cover is desirable and easily applied to a wing of the kind described.

The cover should be drum tight on the wing, and, in this construction which I have shown, the cover can be stretched tightly over a section, and the ends tucked in between the spar members, and clamped in place, when the spar members are locked together. This makes a secure, firm fastening which prevents the cover or skin from any possible loosening or wrinkling in use.

I claim:

1. A wing for air craft, comprising separable sections, spars separable along their length with parts of each spar in the adjacent section, means for fastening the spar parts together, and a cover for the wing having parts clamped between the spar parts.

2. A wing for air craft, comprising spars, separable along their length, transverse metal sectional ribs of the contour of the adjacent part of the wing, respective ribs being fastened to that section of the spar in its own wing section, longitudinal braces extending through the several ribs, and means for fastening the spar parts together.

3. A wing for air craft, comprising separable spar members, transverse metal ribs having end portions abutting with the spars, and gussets or flanges integral with the ribs fitting snugly and fastened to the adjacent spar surfaces.

4. In a wing for air craft, the combination with transverse metal ribs having holes therethrough near their upper and lower parts, of tubular longitudinal stiffening braces extending through the holes and fastening flanges integral with the ribs connecting the ribs and braces.

5. In a wing construction for air craft, the combination with transverse sheet metal ribs having triangular holes disposed near their upper and lower parts, of tubular longitudinal stiffening braces, triangular in cross section, extending through the said holes in the ribs, and fastening flanges integral with the ribs connecting the ribs and braces.

6. A wing for air craft, having spars in the general form of I beams, comprising complementary sections in flatwise contact, each section having a flat web merging at each edge into an integral triangular tubular flange, means for fastening the two complementary sections together, transverse ribs of metal having holes therethrough, disposed near their upper and lower parts, and longitudinal braces extending through the several holes of the rib.

7. A wing for air craft, made in sections separable, longitudinally and transversely of the wing, the wing spar being of general I beam construction and built up of web members carried by separate wing sections and extending through the transverse sections, rib members extending transversely of the web members and fastened to either web member in its section of the wing, means for securing the web members in flatwise contact in a vertical plane to form the I beam, and stiffening tubular braces extending longitudinally of the wing and secured to the rib members.

8. A wing for aircraft comprising a plurality of separable longitudinal frame sections, individual covers for each of said frame sections, the covers being fastened to the frame sections and the edges of the covers lying between the several adjacent sections of said wing.

In testimony whereof, I have signed my name to this specification this 2nd day of May, 1927.

EDMUND B. CARNS.